Nov. 8, 1960 J. C. MOERKENS 2,959,712
VOLTAGE-COMPENSATING CIRCUIT ARRANGEMENT
Filed Oct. 8, 1956
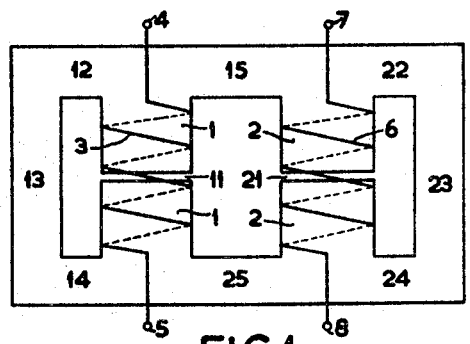
FIG.1
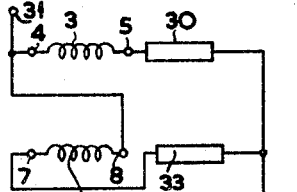
FIG.2
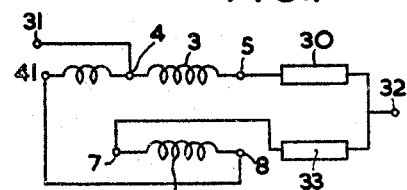
FIG.4
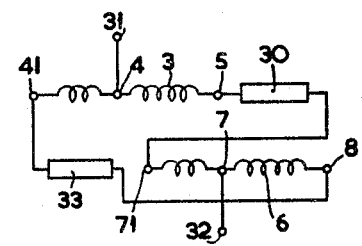
FIG.5
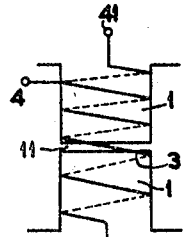
FIG.3
FIG.6
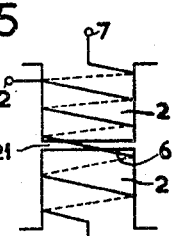
FIG.7
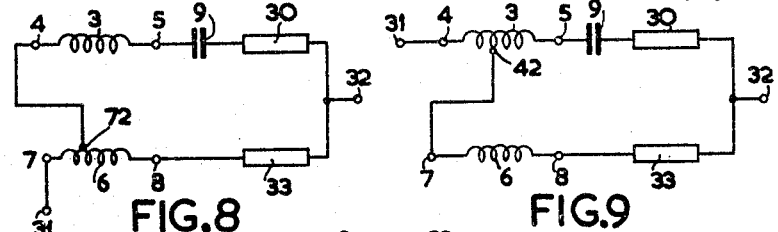
FIG.8   FIG.9
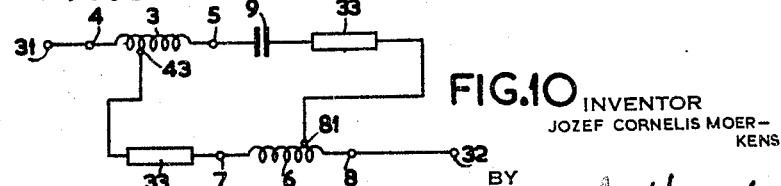
FIG.10
INVENTOR
JOZEF CORNELIS MOER-
KENS
BY
AGENT United States Patent Office 2,959,712
Patented Nov. 8, 1960

2,959,712

VOLTAGE-COMPENSATING CIRCUIT ARRANGEMENT

Jozef Cornelis Moerkens, Eindhoven, Netherlands, assignor, by mesne assignments, to North American Philips Company, Inc., New York, N.Y., a corporation of Delaware Filed Oct. 8, 1956, Ser. No. 614,658

Claims priority, application Netherlands Nov. 24, 1955

12 Claims. (Cl. 315—257)

The invention relates to a circuit arrangement provided with two chokes which are connected each in a different circuit, whereas their magnetic circuits are partly common and comprise four parallel arranged cores, two of which are cores surrounded by windings and having at least one air-gap and two of which are cores not surrounded by windings and having no air-gap, and also four yokes, each of which connects a surrounded core to an unsurrounded core.

This application is a continuation-in-part of application Serial No. 614,659, filed October 8, 1956.

According to the invention, the cores surrounded by windings are arranged closely adjacent and the cores not so surrounded are so disposed on both sides of the cores surrounded by windings that the windings are situated between the cores not so surrounded, the cross-sectional area of the yokes not exceeding that of the latter cores. This results in a satisfactory mechanical protection of the windings and a low iron weight.

Since a small part of the magnetic flux of one coil flows through the gapped core of the other coil, a voltage is induced in this latter coil and conversely. As a result, the circuits with which the windings of the chokes are associated are not independent from one another to such an extent as in the case of two magnetically separated chokes.

This dependence can be reduced if at least one of the choke windings is provided with an auxiliary winding which is connected in series with the other choke winding, is magnetically coupled to its own main winding and is connected with respect to this main winding so that the extra voltage induced by the first choke winding in the other choke winding is counteracted.

The choke windings may be so connected that, when a current which lags with respect to the supply voltage passes through one of these windings, in the other choke winding which passes no current an extra voltage is induced which extra voltage tends to reduce the voltage across the circuit of this other choke winding, the auxiliary winding being connected so that the total voltage across the associated auxiliary and main windings exceeds that across this main winding alone.

The choke windings may also be so connected that, if a current which lags with respect to the supply voltage passes through one of these windings, in the other choke winding which passes no current an extra voltage is induced which extra voltage tends to increase the voltage across the circuit of this other choke winding, the auxiliary winding being so connected that the total voltage across the associated auxiliary and main windings is less than that across this main winding alone.

When each choke is provided with an auxiliary winding, each auxiliary winding can be connected to another terminal of the circuit arrangement.

In order that the invention may be readily carried into effect, it will now be described more fully with reference to the accompanying drawing, wherein:

Fig. 1 is a schematic diagram of an embodiment of a core arrangement for choke windings;

Fig. 2 is a schematic diagram of an embodiment of a circuit arrangement utilizing choke windings;

Fig. 3 is a modification of a portion of the embodiment of Fig. 1;

Fig. 4 is a schematic diagram of an embodiment of the circuit arrangement of the present invention;

Fig. 5 is a modification of the embodiment of Fig. 4;

Fig. 6 is a schematic diagram of another embodiment of a circuit arrangement utilizing choke windings;

Fig. 7 is a modification of a portion of the embodiment of Fig. 1;

Fig. 8 is a schematic diagram of a preferred embodiment of the circuit arrangement of the present invention;

Fig. 9 is a modification of the embodiment of Fig. 8; and

Fig. 10 is another modification of the embodiment of Fig. 8.

In Fig. 1, reference numerals 1 and 2 denote two laminated iron cores having air-gaps 11 and 21 respectively at their centers.

A winding 3, the ends of which are designated 4 and 5, is provided on the core 1. The core 2 is provided with a winding 6 having ends 7 and 8.

The winding sense of these windings is such that, when the ends 4 and 7 are connected to one terminal of a suitable direct voltage supply and the ends 5 and 8 to the other terminal of this supply, the magnetic poles of like nature of the magnets so produced are on the same side of the air-gaps in the cores 1 and 2.

The magnetic circuit of the core 1 is closed through a yoke 12, a core 13 not surrounded by a winding and having no air-gap and a yoke 14 and also through a yoke 15, a yoke 22, a core 23 not surrounded by a winding and having no air-gap, a yoke 24 and a yoke 25.

The magnetic circuit of the core 2 is closed through the yoke 22, the core 23 and the yoke 24 and also through the yoke 15, the yoke 12, the core 13, the yoke 14 and the yoke 25.

In the arrangement shown in Fig. 2, the choke winding 3 is connected in series with a gas discharge tube 30, for example a 40 w. fluorescent lamp, and the choke winding 6 is connected in series with a similar discharge tube 33 to the terminals 31 and 32 fed with an alternating voltage. The sequence of the windings and discharge tubes in the various circuits is not essential. Fig. 2 shows a case where the windings are connected to the terminal 31 and the tubes to the terminal 32.

Since the ends 4 and 8 face the terminal 31, the windings 3 and 6 are so connected in their respective electric circuits that the magnetic fluxes produced by the windings in normal operation in the common cores 13 and 23 and yokes 12, 14, 22 and 24 oppose each other. This results in a saving in iron, since the cores 13 and 23 and the yokes 12, 14, 22 and 24 can be proportioned for the case where only one of the windings is connected in circuit; this may be the case when one of the tubes has failed.

If the windings were so connected that they produce magnetic fluxes of the same direction in the common cores 13 and 23 and the yokes 12, 14, 22 and 24, the cross-sectional area of the cores 13 and 23 and the yokes 12, 14, 22 and 24 should have to be twice that in the first case.

The windings 3 and 6 are satisfactorily protected mechanically, since they are arranged between the cores 13 and 23. In addition, the cross-sectional area of the yokes 12, 14, 22 and 24 which each connect a core surrounded by a winding to a core not so surrounded does not exceed that of the latter cores.

A small part of the flux produced by the winding 3 flows through the core 2 of the winding 6 and induces an extra voltage in this winding. For the sake of simplicity, it is assumed here that the circuit 6—33 is broken, for example because the tube 33 does not operate.

When the tube 33 is operative and the tube 30 is not operative, an extra voltage is induced similarly in the winding 3.

It will be obvious that both additional voltages appear if both circuits are complete. Consequently, the circuits are slightly dependent upon one another and this is frequently inconvenient.

The extra voltages induced in the windings 3 and 6 respectively tend to reduce the voltages across the tubes 30 and 33 respectively. This voltage-reducing effect is produced because the windings 3 and 6 are so connected that the magnetic fluxes oppose each other in the cores 13 and 23 not surrounded by windings and consequently have the same directions in the cores 1 and 2 which are surrounded by windings. If the windings 3 and 6 were so connected in relation to one another that the magnetic fluxes oppose each other in the cores 1 and 2 the extra voltages would tend to increase the voltages across the tubes concerned.

In order to counteract the adverse effect of the induced extra voltages, the winding 3 is provided with an additional winding 4—41 which is magnetically coupled to it and is designed as an extension of the main winding 3, as is shown in Figures 3 and 4. The end 41 of the auxiliary winding more remote from the winding 3 is connected to the end 8 of the winding 6. The common end 4 of the windings 3 and 4—41 is connected to the terminal 31.

When the tube 30 operates, the windings 3 and 4—41 constitute the secondary winding of an auto-transformer, the primary winding of which is the winding 3. Consequently, a voltage is present between the points 32 and 41 which exceeds that set up between the points 32 and 4. Consequently, the voltages across the circuit 6—33 and across the tube 33 are higher than in the absence of the auxiliary winding 4—41. This enables the voltage-reducing effect of the extra voltage induced in the winding 6 to be compensated.

The voltage across the tube 30 is also increased by the auxiliary winding 4—41, for, when the tube 33 operates, this auxiliary winding constitutes the primary winding of an auto-transformer, the secondary winding 41—5 of which produces a voltage between the points 5 and 32 which is higher than in the absence of the auxiliary winding 4—41.

With a suitable choice of the number of turns of the auxiliary winding 4—41, a substantially complete compensation of the extra voltages can be ensured.

Obviously, the winding 6 instead of the winding 3 may be provided with an auxiliary winding.

Fig. 5 shows the case where both windings 3 and 6 are provided with auxiliary windings 4—41 and 7—71, respectively. The auxiliary windings are connected to different terminals of the circuit arrangement, that is to say the winding 4—41 to 31 and the winding 7—71 to 32. Other things being equal, the number of turns of each auxiliary winding is less than the number required if only one auxiliary winding were provided.

Fig. 6 shows another circuit arrangement comprising two parallel-connected tube circuits. In this arrangement, the choke windings 3 and 6, which need not have the same number of turns as in the preceding cases, are differently connected in relation to one another. The winding ends 4 and 7 are connected to the terminal 31 and the ends 5 and 8 are connected nearer the terminal 32. Furthermore, the circuit of the tube 30 includes a series capacitor 9, the impedance of which exceeds that of the choke 3. Consequently, in normal operation the tube 30 carries a current which leads with respect to the supply voltage and the tube 33 carries a current which lags with respect to this voltage.

Usually the tube voltage is about one half of the supply voltage, in which event the phase shift between the tube currents is about 120°. The magnetic fluxes in the common cores 13 and 23 and the yokes 12, 14, 22 and 24 also have a relative phase shift of about 120°, in which event the vector sum of two equal components does not exceed any one of the components; consequently, the common cores 13 and 23 not surrounded by windings and the yokes 12, 14, 22 and 24 need not have a cross-sectional area exceeding one half of that of one of the cores which are surrounded by windings.

It will be evident that in this case also the choke windings 3 and 6 induce extra voltages in one another.

If only the tube 33 operates, a voltage is induced in the winding 3 which does not tend to reduce the voltage across the tube 30, but tends to increase it, since the windings 3 and 6 are now connected differently with respect to one another than in the case shown in Fig. 2.

If, however, only the tube 30 operates, the extra voltage induced in the winding 6 would also tend to increase the voltage across the tube 33 but the capacitor 9 which is connected in the circuit of the winding 3 more or less inverts the phase of the induced extra voltage; as a result, the voltage across the tube 33 which is not yet operative is reduced.

In order to prevent this voltage reduction, use is made of at least one auxiliary winding which is so connected that the undesirable extra voltages are counteracted. In its simplest form this connection of the auxiliary winding is produced by the provision of a tapping point on the associated main winding.

In Figures 7 and 8, the winding 6 has a tapping point at 72 so that an auxiliary winding 7—72 is produced which is connected in series with the circuit of the tube 30 and naturally coincides with part of the circuit of the tube 33. Obviously, the sum total of the voltage across the main and auxiliary windings, i.e. the voltage between the points 72 and 8, is now less than the voltage across the main winding 6 only, i.e. the voltage present between the points 7 and 8.

When the tube 33 operates, the voltage set up between the points 72 and 32 is lower than the supply voltage 31—32, so that the voltage across the circuit of the other tube and across the tube 33 itself is lower than in the absence of the auxiliary winding 7—72.

If the tube 30 operates, the voltage between the points 72 and 32 exceeds that between the points 7 and 32 due to the provision of the capacitor 9; the auxiliary winding 7—72 is the primary of an auto-transformer, the secondary of which is constituted by the entire winding 6; the voltage between the points 8 and 32 exceeds that between the points 72 and 32 so that the voltage across the tube 33 is higher than in the absence of the auxiliary winding 7—72. In a practical embodiment, the number of turns of the auxiliary winding 7—72 was about 6% of that of the main winding 6.

In the circuit arrangement shown in Fig. 9, the winding 3 is provided with a tapping point 42 and the circuit of the tube 33 is connected between points 42 and 32.

When the tube 33 operates, the voltage present between the points 42 and 32 and also that between the points 5 and 32 is lower than the supply voltage 31—32; consequently the voltage across the tube 30 is lower than in the absence of the auxiliary winding 4—42.

When the tube 30 operates, the voltage between the points 42 and 32 exceeds the supply voltage 31—32 due to the provision of the capacitor 9; consequently, the voltage set up across the tube 33 which is not ignited is higher than in the absence of the auxiliary winding 4—42.

In the circuit arrangement shown in Fig. 10, both windings 3 and 6 are provided with tapping points 43 and 81, respectively. Thus, auxiliary windings 4—43 and 8—81 are produced, each of which is connected in series with the circuit of the other main winding to the terminals 31 and 32. Their operation is similar to that of the auxiliary windings of the arrangements shown in Figures 8 and 9; however, the number of turns per auxiliary winding can be less than in an arrangement having only a single auxiliary winding.

What is claimed is:

1. A circuit arrangement comprising a magnetic circuit arrangement, said magnetic circuit arrangement comprising a first pair of spaced parallel positioned cores, a pair of yokes joining said cores at the extremities thereof and a second pair of parallel positioned cores interposed in the space between said first pair of cores and parallel to the said first pair of cores, said second pair of cores being joined at the extremities thereof by said yokes, each of said second pair of cores having an air-gap therein, a first circuit branch comprising a first gaseous discharge device, a first winding portion wound on one of said second pair of cores and a capacitor connected in series circuit arrangement with said first discharge device and said first winding portion, a second circuit branch comprising a second gaseous discharge device and a second winding portion connected in series circuit arrangement with said second discharge device, said second winding portion being wound on the other of said second pair of cores, means connecting said first and second circuit branches in parallel circuit arrangement, a first terminal, a second terminal connected to said parallel circuit arrangement at a point common to said first and second circuit branches, means for applying an alternating voltage to said first and second terminals, and an auxiliary winding portion magnetically coupled to one of said first and second winding portions and integrally connected to said one of said first and second winding portions between said parallel circuit arrangement and said first terminal whereby a voltage induced in either of said first and second winding portions by the other of said first and second winding portions is counteracted by the voltage across said auxiliary winding portion, said auxiliary winding portion being wound on the core of the winding portion to which it is integrally connected.

2. A circuit arrangement comprising a magnetic circuit arrangement, said magnetic circuit arrangement comprising a first pair of spaced parallel positioned cores, a pair of yokes joining said cores at the extremities thereof and a second pair of parallel positioned cores interposed in the space between said first pair of cores and parallel to the said first pair of cores, said second pair of cores being joined at the extremities thereof by said yokes, each of said second pair of cores having an air-gap therein, a first circuit branch comprising a first gaseous discharge device, a first winding portion wound on one of said second pair of cores and a capacitor connected in series circuit arrangement with said first discharge device and said first winding portion, a second circuit branch comprising a second gaseous discharge device and a second winding portion connected in series circuit arrangement with said second discharge device, said second winding portion being wound on the other of said second pair of cores, means connecting said first and second circuit branches in parallel circuit arrangement, a first terminal, a second terminal connected to said parallel circuit arrangement at a point common to said first and second circuit branches, means for applying an alternating voltage to said first and second terminals, and an auxiliary winding portion magnetically coupled to said second winding portion and integrally connected to said second winding portion between said parallel circuit arrangement and said first terminal whereby a voltage induced in either of said first and second winding portions by the other of said first and second winding portions is counteracted by the voltage across said auxiliary winding portion, said auxiliary winding portions being wound on the core of said second winding portion.

3. A circuit arrangement comprising a magnetic circuit arrangement, said magnetic circuit arrangement comprising a first pair of spaced parallel positioned cores, a pair of yokes joining said cores at the extremities thereof and a second pair of parallel positioned cores interposed in the space between said first pair of cores and parallel to the said first pair of cores, said second pair of cores, being joined at the extremities thereof by said yokes, each of said second pair of cores having an air-gap therein, a first circuit branch comprising a first gaseous discharge device, a first winding portion wound on one of said second pair of cores and a capacitor connected in series circuit arrangement with said first discharge device and said first winding portion, a second circuit branch comprising a second gaseous discharge device and a second winding portion connected in series circuit arrangement with said second discharge device, said second winding portion being wound on the other of said second pair of cores, means connecting said first and second circuit branches in parallel circuit arrangement, a first terminal, a second terminal connected to said parallel circuit arrangement at a point common to said first and second circuit branches, means for applying an alternating voltage to said first and second terminals, and an auxiliary winding portion magnetically coupled to said second winding portion and integrally connected to said second winding portion between said parallel circuit arrangement and said first terminal whereby a voltage induced in either of said first and second winding portions by the other of said first and second winding portions is counteracted by the voltage across said auxiliary winding portion, said auxiliary winding portions being wound on the core of said second winding portion, said auxiliary winding portion having substantially 6 percent of the number of turns of which said second winding portion constitutes substantially 94 percent.

4. A circuit arrangement comprising a magnetic circuit arrangement, said magnetic circuit arrangement comprising a first pair of spaced parallel positioned cores, a pair of yokes joining said cores at the extremities thereof and a second pair of parallel positioned cores interposed in the space between said first pair of cores and parallel to the said first pair of cores, said second pair of cores being joined at the extremities thereof by said yokes, each of said second pair of cores having an air-gap therein, a first circuit branch comprising a first gaseous discharge device, a first winding portion wound on one of said second pair of cores and a capacitor connected in series circuit arrangement with said first discharge device and said first winding portion, a second circuit branch comprising a second gaseous discharge device and a second winding portion connected in series circuit arrangement with said second discharge device, said second winding portion being wound on the other of said second pair of cores, means connecting said first and second circuit branches in parallel circuit arrangement, a first terminal, a second terminal connected to said parallel circuit arrangement at a point common to said first and second circuit branches, means for applying an alternating voltage to said first and second terminals, and an auxiliary winding portion magnetically coupled to said first winding portion and integrally connected to said first winding portion between said parallel circuit arrangement and said first terminal whereby a voltage induced in either of said first and second winding portions by the other of said first and second winding portions is counteracted by the voltage across said auxiliary winding portion, said auxiliary winding portion being wound on the core of said first winding portion.

5. A circuit arrangement comprising a magnetic circuit arrangement, said magnetic circuit arrangement comprising a first pair of spaced parallel positioned cores, a pair of yokes joining said cores at the extremities thereof and a second pair of parallel positioned cores interposed in the space between said first pair of cores and parallel to the said first pair of cores, said second pair of cores being joined at the extremities thereof by said yokes, each of said second pair of cores having an air-gap therein, a first circuit branch comprising a first gaseous discharge device, a first winding portion wound on one of said second pair of cores and a capacitor connected in series circuit arrangement with said first discharge device and said first winding portion, a second circuit branch comprising a second gaseous discharge device and a second winding portion connected in series circuit arrangement with said second discharge device, said second winding portion being wound on the other of said second pair of cores, means connecting said first and second circuit branches in parallel circuit arrangement, a first terminal, a second terminal connected to said parallel circuit arrangement at a point common to said first and second circuit branches, means for applying an alternating voltage to said first and second terminals, and an auxiliary winding portion magnetically coupled to said first winding portion and integrally connected to said first winding portion between said parallel circuit arrangement and said first terminal whereby a voltage induced in either of said first and second winding portions by the other of said first and second winding portions is counteracted by the voltage across said auxiliary winding portion, said auxiliary winding portion being wound on the core of said first winding portion, said auxiliary winding portion having substantially 6 percent of the number of turns of which said first winding portion constitutes substantially 94 percent.

6. A circuit arrangement comprising a magnetic circuit arrangement, said magnetic circuit arrangement comprising a first pair of spaced parallel positioned cores, a pair of yokes joining said cores at the extremities thereof and a second pair of parallel positioned cores interposed in the space between said first pair of cores and parralled to the said first pair of cores, said second pair of cores being joined at the extremities thereof by said yokes, each of said second pair of cores having an air-gap therein, a first circuit branch comprising a first gaseous discharge device, a first winding portion wound on one of said second pair of cores and a capacitor connected in series circuit arrangement with said first discharge device and said first winding portion, a second circuit branch comprising a second gaseous discharge device and a second winding portion connected in series circuit arrangement with said second discharge device, said second winding portion being wound on the other of said second pair of cores, means connecting said first and second circuit branches in parallel circuit arrangement, first and second terminals, means for applying an alternating voltage to said first and second terminals, and a first auxiliary winding portion magnetically coupled to said first winding portion and integrally connected to said first winding portion between said parallel circuit arrangement and said first terminal and a second auxiliary winding portion integrally connected to said second winding portion between said parallel circuit arrangement and said second terminal whereby a voltage induced in either of said first and second winding portions by the other of said first and second winding portions is counteracted by the voltage across said auxiliary winding portions, said first auxiliary winding portion being wound on the core of said first winding portion and said second auxiliary winding portion being wound on the core of said second winding portion.

7. A circuit arrangement comprising a first circuit branch, said first circuit branch comprising a first gaseous discharge device, a first winding portion and a capacitor connected in series circuit arrangement with said first discharge device and said first winding portion, a second circuit branch comprising a second gaseous discharge device and a second winding portion connected in series circuit arrangement with said second discharge device, means connecting said first and second circuit branches in parallel circuit arrangement, a first terminal, a second terminal connected to said parallel circuit arrangement at a point common to said first and second circuit branches, means for applying an alternating voltage to said first and second terminals, and an auxiliary winding portion magnetically coupled to one of said first and second winding portions connected to said one of said first and second winding portions between said parallel circuit arrangements and said first terminal whereby a voltage induced in either of said first and second winding portions is counteracted by the voltage across said auxiliary winding portion.

8. A circuit arrangement comprising a first circuit branch, said first circuit branch comprising a first gaseous discharge device, a first winding portion and a capacitor connected in series circuit arrangement with said first discharge device and said first winding portion, a second circuit branch comprising a second gaseous discharge device and a second winding portion connected in series circuit arrangement with said second discharge device, means connecting said first and second circuit branches in parallel circuit arrangement, a first terminal, a second terminal connected to said parallel circuit arrangement at a point common to said first and second circuit branches, means for applying an alternating voltage to said first and second terminals, and an auxiliary winding portion magnetically coupled to said second winding portion and connected to said second winding portion between said parallel circuit arrangement and said first terminal whereby a voltage induced in either of said first and second winding portions by the other of said first and second winding portions is counteracted by the voltage across said auxiliary winding portion.

9. A circuit arrangement comprising a first circuit branch, said first circuit branch comprising a first gaseous discharge device, a first winding portion and a capacitor connected in series circuit arrangement with said first discharge device and said first winding portion, a second circuit branch comprising a second gaseous discharge device and a second winding portion connected in series circuit arrangement with said second discharge device, means connecting said first and second circuit branches in parallel circuit arrangement, a first terminal, a second terminal connected to said parallel circuit arrangement at a point common to said first and second circuit branches, means for applying an alternating voltage to said first and second terminals, and an auxiliary winding portion magnetically coupled to said second winding portion and connected to said second winding portion between said parallel circuit arrangement and said first terminal whereby a voltage induced in either of said first and second winding portions by the other of said first and second winding portions is counteracted by the voltage across said auxiliary winding portion, said auxiliary winding portion having substantially 6 percent of the number of turns of which said second winding portion constitutes substantially 94 percent.

10. A circuit arrangement comprising a first circuit branch, said first circuit branch comprising a first gaseous discharge device, a first winding portion and a capacitor connected in series circuit arrangement with said first discharge device and said first winding portion, a second circuit branch comprising a second gaseous discharge device and a second winding portion connected in series circuit arrangement with said second discharge device, means connecting said first and second circuit branches in parallel circuit arrangement, a first terminal, a second terminal connected to said parallel circuit arrangement at a point common to said first and second circuit branches, means for applying an alternating voltage to said first and second terminals, and an auxiliary winding portion magnetically coupled to said first winding portion and connected to said first winding portion between said parallel circuit arrangement and said first terminal whereby a voltage induced in either of said first and second winding portions by the other of said first and second winding portions is counteracted by the voltage across said auxiliary winding portion.

11. A circuit arrangement comprising a first circuit branch, said first circuit branch comprising a first gaseous discharge device, a first winding portion and a capacitor connected in series circuit arrangement with said first discharge device and said first winding portion, a second circuit branch comprising a second gaseous discharge device and a second winding portion connected in series circuit arrangement with said second discharge device, means connecting said first and second circuit branches in parallel circuit arrangement, a first terminal, a second terminal connected to said parallel circuit arrangement at a point common to said first and second circuit branches, means for applying an alternating voltage to said first and second terminals, and an auxiliary winding portion magnetically coupled to said first winding portion and connected to said first winding portion between said parallel circuit arrangement and said first terminal whereby a voltage induced in either of said first and second winding portions by the other of said first and second winding portions is counteracted by the voltages across said auxiliary winding portion, said auxiliary winding portion having substantially 6 percent of the number of turns of which said first winding portion constitutes substantially 94 percent.

12. A circuit arrangement comprising a first circuit branch, said first circuit branch comprising a first gaseous discharge device, a first winding portion and a capacitor connected in series circuit arrangement with said first discharge device and said first winding portion, a second circuit branch comprising a second gaseous discharge device and a second winding portion connected in series circuit arrangement with said second discharge device, means connecting said first and second circuit branches in parallel circuit arrangement, a first terminal, a second terminal connected to said parallel circuit arrangement at a point common to said first and second circuit branches, means for applying an alternating voltage to said first and second terminals, and a first auxiliary winding portion magnetically coupled to said first winding portion and integrally connected to said first winding portion between said parallel circuit arrangement and said first terminal and a second auxiliary winding portion integrally connected to said second winding portion between said parallel circuit arrangement and said second terminal whereby a voltage induced in either of said first and second winding portions by the other of said first and second winding portions is counteracted by the voltage across said auxiliary winding portions.

References Cited in the file of this patent

UNITED STATES PATENTS

| | | |
|---|---|---|
| 1,417,710 | Ballman | May 20, 1922 |
| 2,025,471 | Osborne | Dec. 24, 1935 |
| 2,358,675 | Welch | Sept. 19, 1944 |
| 2,404,254 | Short | July 16, 1946 |
| 2,502,083 | Foerste | Mar. 28, 1950 |
| 2,563,595 | Feinberg | Aug. 7, 1951 |
| 2,668,250 | Henderson | Feb. 2, 1954 |

FOREIGN PATENTS

| | | |
|---|---|---|
| 594,626 | Great Britain | Nov. 14, 1947 |
| 686,856 | Great Britain | Feb. 4, 1953 |